US007844381B2

(12) United States Patent
Roudeau et al.

(10) Patent No.: US 7,844,381 B2
(45) Date of Patent: Nov. 30, 2010

(54) METHOD FOR PRODUCING A SETPOINT ADAPTED TO A CORNERING SITUATION FOR A MOTOR VEHICLE ENGINE-TRANSMISSION UNIT TRANSMISSION DEVICE AND CORRESPONDING DEVICE

(75) Inventors: Frédéric Roudeau, Vitry sur Seine (FR); Jean Bretheau, Antony (FR); Vincent Vermuse, St Germain les Arpajons (FR)

(73) Assignee: Renault s.a.s., Boulogne Billancourt (FR)

( * ) Notice: Subject to any disclaimer, the term of this patent is extended or adjusted under 35 U.S.C. 154(b) by 791 days.

(21) Appl. No.: 11/575,072

(22) PCT Filed: Sep. 5, 2005

(86) PCT No.: PCT/FR2005/050708

§ 371 (c)(1),
(2), (4) Date: Jul. 31, 2007

(87) PCT Pub. No.: WO2006/030142

PCT Pub. Date: Mar. 23, 2006

(65) Prior Publication Data

US 2007/0282508 A1 Dec. 6, 2007

(30) Foreign Application Priority Data

Sep. 10, 2004 (FR) .................................. 04 09646

(51) Int. Cl.
*G06F 7/00* (2006.01)
*G06F 17/00* (2006.01)

(52) U.S. Cl. ........................... 701/51; 701/58; 701/65; 180/197

(58) Field of Classification Search .................. 701/51, 701/53, 54, 55, 58, 65, 70, 72, 82, 84, 87; 180/197; 475/19, 43, 46, 94, 125, 126, 257; 307/10.1, 152

See application file for complete search history.

(56) References Cited

U.S. PATENT DOCUMENTS

| 4,779,202 A | * | 10/1988 | Leiber | ......................... 701/90 |
| 4,989,686 A | * | 2/1991 | Miller et al. | ................. 180/197 |
| 2002/0099490 A1 | | 7/2002 | Wakamatsu et al. | |

FOREIGN PATENT DOCUMENTS

| EP | 0 874 149 A2 | 10/1998 |
| EP | 1 275 551 A1 | 1/2003 |
| FR | 2 834 939 | 7/2003 |

OTHER PUBLICATIONS

U.S. Appl. No. 11/575,030, filed Mar. 9, 2007, Roudeau, et al.

* cited by examiner

*Primary Examiner*—Jack Keith
*Assistant Examiner*—Rami Khatib
(74) *Attorney, Agent, or Firm*—Oblon, Spivak, McClelland, Maier & Neustadt, L.L.P.

(57) ABSTRACT

A device for controlling an automated transmission of a motor vehicle engine-transmission unit capable of delivering a torque setpoint signal to be applied to the motor vehicle wheels, including two static and dynamic components, produced based on input data delivered by an input unit including a recorded list of parameters representing the driver's wishes, the motor vehicle state, and the motor vehicle surroundings. The device includes a first unit capable of calculating a dynamic torque component not adapted to a cornering situation; a second unit capable of calculating a static torque component, connected to the input of the first unit; and a unit for adaptation to the come in situation delivering a static torque component adapted to the cornering situation in accordance with a list of predetermined input parameters.

15 Claims, 4 Drawing Sheets

METHOD FOR PRODUCING A SETPOINT ADAPTED TO A CORNERING SITUATION FOR A MOTOR VEHICLE ENGINE-TRANSMISSION UNIT TRANSMISSION DEVICE AND CORRESPONDING DEVICE

BACKGROUND OF THE INVENTION

I. Field of the Invention

The present invention relates to a method of formulating a setpoint for a transmission of a motor vehicle power train in a situation termed cornering. It also relates to a device implementing such a method of formulating a setpoint.

This method applies advantageously to automated transmission devices in particular impulse Control Boxes termed BCI, Automatic Control Boxes termed BVA and Robotized Wear Boxes termed BVR, but also continuous-ratio transmissions, such as CVT ("Continuous Variable Transmission"), IVT ("Infinitely Variable Transmission") and hybrid transmissions.

II. Description of the Related Art

A motor vehicle automated transmission conventionally comprises a control block receiving one or more input parameters interpreting inter alia, the desire of the driver. Then, as a function of the value of these parameters, the control block delivers a control setpoint with a view to an application to the wheels of the motor vehicle.

An upgrade of such a control block has already been described in document FR-A-2827339, in the name of the Applicant. This document details a device for controlling the operating point of a power train. The control carried out by this device is a torque control to be applied to the wheels of the motor vehicle. As defined in document FR-A-2827339, the value of the torque to be applied to the wheels of the motor vehicle is calculated directly at the wheels of the motor vehicle.

The device of document FR-A-2827339 possesses a module for interpreting the desire of the driver called an IVC module.

The IVC module generates a torque setpoint to be applied to the wheels destined for a block for optimization of the operating point OPF. The latter transmits said torque with a view to a torque control to be applied to the wheels of the motor vehicle. The OPF block simultaneously generates an engine revs setpoint on the basis of said torque to be applied to the wheels of the motor vehicle. This torque setpoint to be applied to the wheels of the motor vehicle is determined as a function of the desire of the driver, of the characteristics of the motor vehicle and of its environment, so as to best adapt the behavior of the motor vehicle, according to the driving situations.

In the cornering phase, a driver, at the steering wheel of a motor vehicle equipped with a conventional automatic transmission, has to cope with awkward driving situations.

For example, on approaching a corner, the driver generally eases off the accelerator pedal. The automatic gearbox which was previously in a given gear, then shifts directly to the gear above on account of the conventional shifting laws of an automatic gearbox. It thus deprives the motor vehicle of engine brake. The shift to the gear above then causes an unpleasant sensation of boarding of the motor vehicle.

In a driving situation, when the driver approaches a corner in a high gear, (fourth gear for example), and slows down through this corner, he is in general in the same high gear coming out of the corner. He must therefore depress the accelerator pedal to the maximum to cause the motor vehicle to pick up again. This action is often experienced badly by the driver and the passengers of the motor vehicle.

Methods and associated devices which make it possible to perform adaptations so as to attempt to improve passenger comfort in the cornering phase are already known in the prior art.

Document U.S. Pat. No. 5,514,051 filed by Porsche, proposes a method consisting in adjusting driving parameters of the motor vehicle as a function of predefined adjustment suites. When the motor vehicle is in a particular state, a cornering state for example a computer then refers to these predetermined profiles to adjust the driving parameters.

The solution proposed by document U.S. Pat. No. 5,514,051 makes it necessary to define, during the construction of each motor vehicle, a series of reference driving profiles.

A correction procedure based on laws for shifting gear ratios in a cornering situation according to various predetermined parameters such as for example the speed of movement or the lateral acceleration of the motor vehicle are also known through the documents FR-2 779 793 filed by the Applicant and FR-2 827 026 filed by the Applicant and PSA. These shifting laws make it possible to retain a gear ratio or to downshift in a cornering situation. This solution, adapted to automatic transmissions with discrete ratios is not at all so in the case of automatic transmissions with continuous ratios.

Document FR-2 834 939 in the name of the Applicant proposes to effect an adaptation of the control setpoint of the power train for particular driving phases especially during the cornering phases. The adaptation of the setpoint is done at the engine revs level.

BRIEF SUMMARY OF THE INVENTION

The present invention is aimed at remedying the aforesaid drawbacks. The principle of the invention consists in envisaging an adaptation of the torque setpoint to be applied to the wheels of the motor vehicle so as to improve the behavior of the motor vehicle in a cornering situation. The invention furthermore envisages a torque reserve applicable to the wheels of the motor vehicle to help it pick up again after each cornering. This adaptation in the cornering phase is applied directly to the torque calculated at the wheel, as defined previously thereby allowing greater accuracy as regards the corrections made.

Furthermore, the adaptation proposed by the invention is capable of operating with any type of transmission.

For this purposes the invention proposes a method of controlling an automated transmission of a power train for a motor vehicle. This method comprises a step of formulating a torque setpoint to be applied to the wheel, composed of two components, static and dynamic, formulated as a function of input data representative of the characteristics of the motor vehicle, of the desire of the driver and of the environment of the motor vehicle. The static component of torque forms the subject of an adaptation in the cornering phase and beyond said cornering phases as a function of a list of predetermined parameters, said adaptation in the cornering phase comprising the following steps:

a) produce a dynamic component of raw torque representative of the desire of the driver as a function of predetermined input parameters, then correct it to obtain a dynamic torque component, b) determine a static component of raw torque on the basis of said dynamic torque component, c) calculate a static torque component adapted to a cornering situation, as a function of said static component of raw torque.

This method makes it possible to generate a torque setpoint to be applied to the wheels, adapted to a cornering situation. It will make it possible to obtain engine revs adapted to the situation. The proposed solution allows the motor vehicle to have available a sufficient torque reserve so that the passengers of the motor vehicle do not experience the unpleasant sensations related to a change of operating point of the power train necessary for the resumption of acceleration coming out of the corner.

Preferably, said static torque component adapted to a cornering situation is integrated with additional corrections, dependent on the driving phase considered, so as to deliver a static component of optimal torque.

According to one mode of implementation, it is possible to adapt the setpoint in the cornering phase and beyond the cornering phase as a function of a signal representative of the position of the accelerator pedal of the motor vehicle.

According to another mode of implementation, it is possible to adapt the setpoint in the cornering phase and beyond the cornering phase as a function of the engine revs of the motor vehicle.

According to another mode of implementation, it is possible to adapt the setpoint in the cornering phase and beyond the cornering phase as a function of the transverse acceleration of the motor vehicle.

According to another mode of implementation, it is possible to adapt the setpoint in the cornering phase and beyond the cornering phase as a function of the speed of the motor vehicle.

According to another mode of implementation, it is possible to adapt the setpoint in the cornering phase and beyond the cornering phase as a function of the instantaneous maximum torque applicable to the wheels of the motor vehicle.

According to a preferred mode of implementation, the step of calculating the static torque component adapted to a cornering situation comprises the following sub-steps:

d) calculate a raw cornering setpoint signal as a function of the speed of the motor vehicle, of the transverse acceleration of the motor vehicle and of the engine revs of the motor vehicle, e) construct a first step signal corresponding to said raw cornering setpoint signal but delayed and a second signal corresponding to said raw cornering setpoint signal but filtered, and f) compare and integrate said signal corresponding to said raw cornering setpoint signal but filtered, with a list of predetermined input parameters comprising the static component of raw torque, the instantaneous maximum torque applicable to the wheels of the motor vehicle, the speed of the motor vehicle, the transverse acceleration of the motor vehicle.

Preferably, said raw cornering setpoint signal is constructed by comparing the transverse acceleration of the motor vehicle with dynamic thresholds mapped as a function of the speed of the motor vehicle and of the engine revs of the motor vehicle.

The invention is also aimed at a device for an automated transmission of a power train for a motor vehicle able to deliver a torque setpoint signal to be applied to the wheels of the motor vehicle, comprising two components, static and dynamic, formulated as a function of input data delivered by an input block which comprises a recorded list of parameters representative of the desire of the driver, of the state of the motor vehicle and of the environment of the motor vehicle. The control device advantageously comprises:

a first block able to calculate a dynamic torque component without adaptation to the cornering situation, a second block able to calculate a static component of raw torque, connected to the output of said first block able to calculate the dynamic torque component without adaptation to the cornering situation, a block for adaptation to the cornering situation delivering a static torque component adapted to the cornering situation as a function of a list of predetermined input parameters.

According to one embodiment, the device advantageously comprises means for integrating the static torque component adapted to a cornering situation with additional corrections dependent on the driving phase considered.

The list of predetermined parameters of the block for adaptation to the cornering situation advantageously comprises the static component of raw torque, the instantaneous maximum torque applicable to the wheels of the motor vehicle, the speed of the motor vehicle, the transverse acceleration of the motor vehicle and the current setpoint of engine revs.

According to one embodiment, the block for adaptation to the cornering situation of the static component of raw torque can comprise:

a first block for constructing a raw cornering setpoint signal, a second block for constructing a step signal corresponding to said raw cornering setpoint signal but delayed and a signal corresponding to said raw cornering setpoint signal but filtered, a block for filtering the transverse acceleration of the motor vehicle, a means able to store a first mapping delivering a weighting setpoint as a function of the speed of the motor vehicle, a means able to store a second mapping so as to determine, as a function of the motor vehicle's transverse acceleration filtered by said filtering block, a percentage of the deviation between the instantaneous maximum torque component applicable to the wheels of the motor vehicle and the static component of raw torque, means for comparing and for integrating said raw cornering setpoint signal but filtered, with the raw static torque component, of the instantaneous maximum torque applicable to the wheels of the motor vehicle, the speed of the motor vehicle, the engine revs of the motor vehicle and the transverse acceleration of the motor vehicle.

Preferably, the first construction block comprises means able to store two mappings relating respectively to positive and negative thresholds of the transverse acceleration of the motor vehicle and comparison means able to generate the raw signal representative of the cornering as a function of a list of predetermined input parameters.

According to an embodiment, the list of predetermined parameters can comprise the engine revs of the motor vehicle, the transverse acceleration of the motor vehicle and the speed of the motor vehicle.

BRIEF DESCRIPTION OF THE DRAWINGS

Other advantages and characteristics of the invention will appear on examining the detailed description of a wholly nonlimiting embodiment of the invention, and the appended drawings, in which.

DETAILED DESCRIPTION OF THE INVENTION

Figure 1:
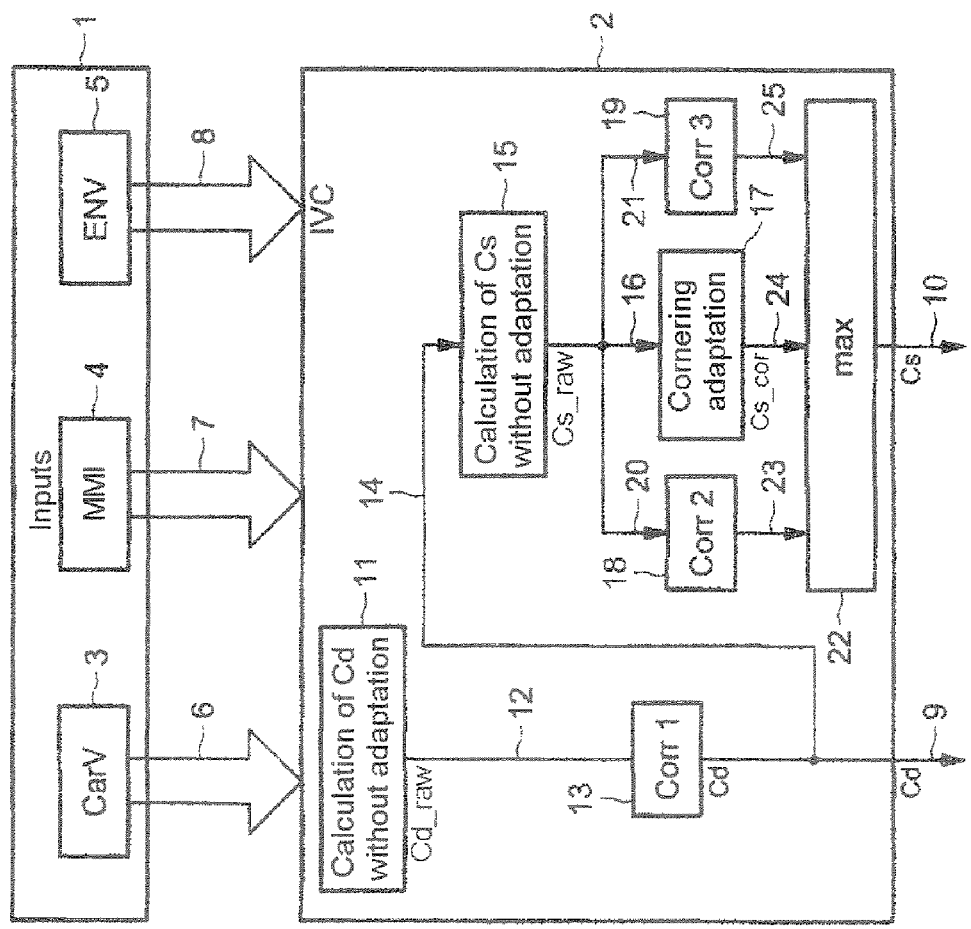
FIG. 1 is a schematic diagram of an exemplary embodiment of an IVC module integrating the adaptation of the setpoint in the cornering phase.

We refer to FIG. 1. Represented in this figure is the integration of the device for adaptation of the torque setpoint to be applied to the wheels of the motor vehicle in the cornering phase, into the automated transmission box of the motor vehicle (not represented).

This device comprises two blocks 1 and 2, respectively an inputs block 1 and an IVC module 2.

The function of the input block 1 is to deliver the input parameters to the module 2 for the adjustment of the torque setpoint to be applied to the wheels of the motor vehicle, in the cornering phase. The block 1 receives as input signals delivered by sensors (not represented) integrated with the motor vehicle.

These input data, transmitted to the module 2 by the block 1, can be delivered respectively to each functional block included in this module 2.

The input block 1 comprises three modules 3, 4 and 5. Each of these three modules delivers a predetermined type of input data to the module 2.

A first module 3 denoted CarV is capable of formulating the data relating to the characteristics of the motor vehicle. These are programmed and stored in a memory common to the device (not represented) by the constructor so as to characterize the behavior of the vehicle delivered to a customer.

A second module 4 denoted MMI (man/machine interface) is capable of formulating data relating to the desire of the driver. These data interpret the wishes of the driver. They can for example comprise signals representative of the brake or accelerator pedal of the motor vehicle or else a signal interpreting the sportiness of the driver. In one embodiment, it is noted that the monitoring of the automated transmission box can evaluate the sportiness of the driver from 0 to 100%.

A third module denoted 5 ENV is capable of formulating signals relating to the environment of the motor vehicle. These make it possible to take account of the state of the motor vehicle and of its situation in the environment. They comprise for example signals corresponding to the engine revs, to the speed or else to the lateral acceleration of the motor vehicle, particularly in a cornering situation.

The signals delivered by the three modules 3, 4 and 5 are formulated on the basis of signals originating from sensors (not represented) integrated with the motor vehicle.

These three modules 3, 4 and 5 are respectively connected to the IVC module 2 by way of the connections 6, 7 and 8.

The IVC module 2, described in document FR-A-2 827 339, in the name of the Applicant, represents a block able to generate a torque setpoint to be applied to the wheels of the motor vehicle by interpreting the desire of the driver.

The module 2 receives as input the input parameters formulated by the block 1 and delivers as output the dynamic Cd (or dynamic torque setpoint) and static Cs (or static torque setpoint) components of the torque setpoint to be applied to the wheels of the motor vehicle. The two setpoints are respectively transmitted by way of the connections 9 and 10. The setpoints Cd and Cs are targets intended to be optimized so as to formulate an optimal engine revs setpoint.

The dynamic torque setpoint Cd is the value of the torque that the driver wishes to see achieved instantaneously. The static torque setpoint Cs is defined as the future torque setpoint that the driver could demand and that the power train must render immediately available at the wheels of the motor vehicle. The setpoint Cs evolves slowly. Specifically, it is not aimed at meeting an immediate demand of the driver. It has to be the reflection of a tendency imposed by the behavior of the driver over a predetermined period. Stated otherwise, the torque Cs corresponds to the torque value applicable to the wheels of the motor vehicle that the driver would wish to obtain by reloading the accelerator pedal of the motor vehicle.

According to the invention, the module 2 comprises three functional blocks 11, 15 and 17.

The first functional block is a block 11 (Calculation of Cd without adaptation) able to calculate a dynamic torque setpoint without adaptation denoted Cd_raw. This Cd_raw setpoint is calculated on the basis of the signals representative of the position of the accelerator pedal of the motor vehicle, of the revs of the engine of the motor vehicle and of the speed of the motor vehicle, these signals being delivered by the input block 1.

The Cd_raw setpoint can undergo additional corrections, for example an adaptation of the setpoint in a slope situation. For this purpose, the Cd_raw setpoint is transmitted by way of the connection 12 to a corrective block 13 denoted Corr1, which delivers the setpoint Cd as output.

The second functional block is a block 15 (Calculation of Cs without adaptation) which is capable of calculating a Cs_raw static torque setpoint without particular adaptation. The Cs_raw setpoint is constructed on the basis of the dynamic torque Cd, arising from the block 13 Corr1 and transmitted via the connection 14. Furthermore, the Cs_raw setpoint is calculated as a function of parameters such as the sportiness of the driver for example; this parameter can be, for example, calculated on the basis of the signal representative of the position of the accelerator pedal of the motor vehicle, delivered by the input block 1.

The Cs_raw setpoint is delivered, by way of a connection 16, to the third functional block 17 integrated with the module 2. The function of the block 17 (Cornering adaptation) is to formulate, on the basis of the Cs_raw setpoint, a torque setpoint applicable to the wheels of the motor vehicle, adapted to the cornering situation Cs_cor. The setpoint Cs_cor delivered by the block 17 affords the possibility of improving the operating point of the motor vehicle. Specifically, the operating point will make it possible to preset the value of the engine revs, to a value anticipating the desire of the driver. The block 17 will be described in greater detail hereafter.

In parallel with the adaptation to the cornering situation, the Cs_raw setpoint can undergo other corrections, for example in a braking or slope situation. These additional corrections are performed respectively by the two corrective blocks 18 Corr2 and 19 Corr3. The Cs_raw setpoint is transmitted to the blocks 18 and 19 by the respective connections 20 and 21.

The three blocks 17, 18 and 19 deliver their output setpoints to the block 22 denoted max. The block 18 delivers its setpoint to the block 22 via a connection 23, the block 17 via a connection 24 and the block 19 via a connection 25.

The block 22, placed at the output of the blocks 17, 18 and 19, arbitrates the various corrections effected by these three blocks. Specifically, the setpoint Cs can comprise at one and the same time an adaptation for cornering and an adaptation for braking for example. The block 22 then delivers as output an output setpoint Cs integrating the various corrections made.

Figure 2:
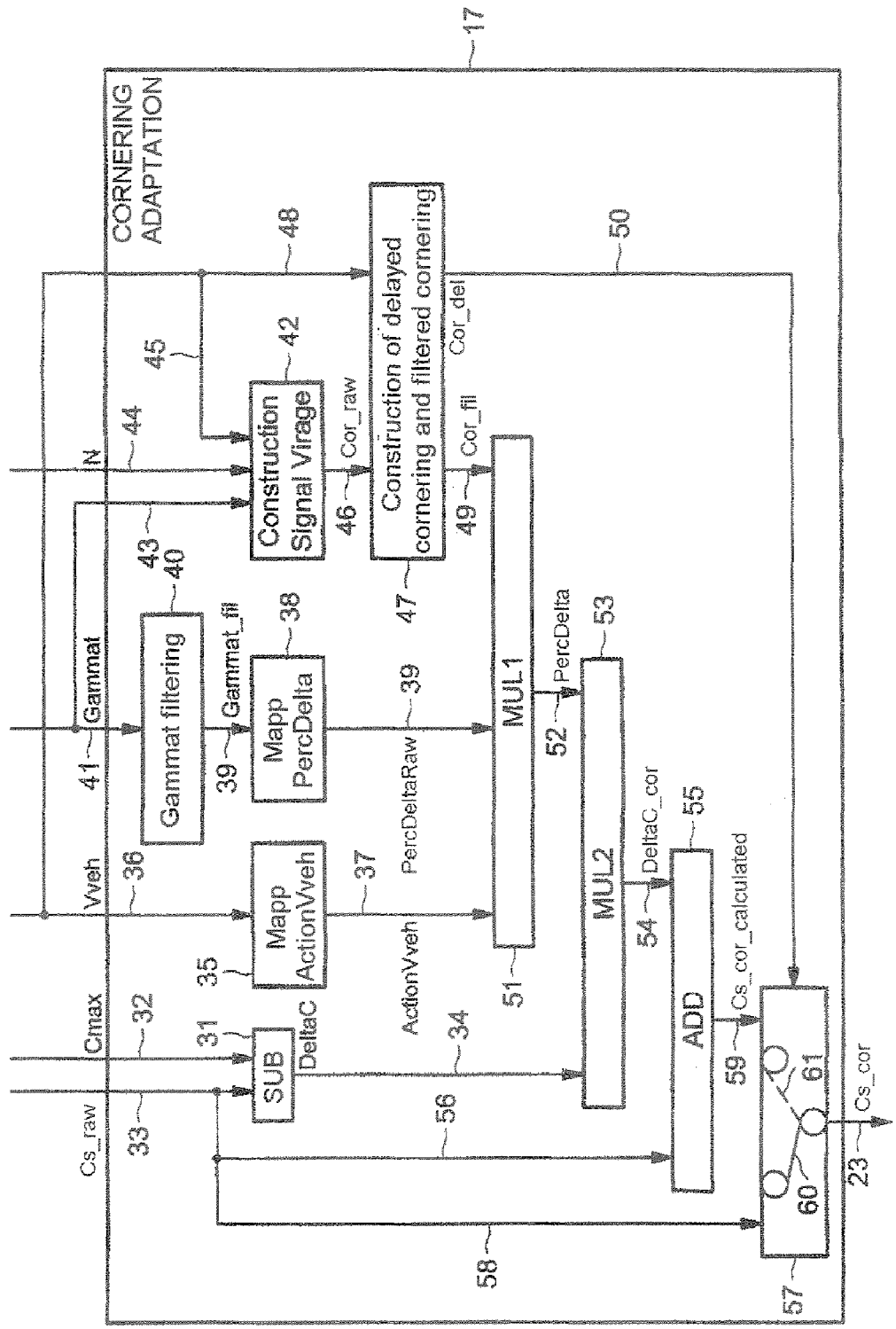
FIG. 2 represents more precisely an exemplary embodiment of a detail of the diagram of FIG. 1.

FIG. 2 is now referred to. This figure details the block 17 carrying out the adaptation of the Cs_raw setpoint in the cornering phase.

The block 17 receives various input parameters such as the speed of the motor vehicle denoted Vveh, the engine revs setpoint denoted N and the transverse acceleration denoted Gammat. The transverse acceleration can be measured by an accelerometer integrated with the motor vehicle, but also calculated on the basis of the speed of the motor vehicle. All these input parameters originate from the input block 1, represented in FIG. 1, and delivered to the various blocks included in the module 2.

The block 17 also receives Cs_raw arising from the block 15 (Calculation of Cs without adaptation), as well as the component Cmax which is the maximum torque applicable to the wheels of the motor vehicle, that the power train can provide instantaneously to the wheels of the motor vehicle. This component Cmax is produced with the aid of a recorded table (not represented) which is addressed, in a preferred embodiment, as a function of the rotation speed measured at the wheel of the motor vehicle. The value Cmax therefore evolves dynamically as a function of the speed of the motor vehicle.

The block 17 comprises several functional blocks allowing the construction of the setpoint Cs_cor.

Firstly the block 17 comprises a subtracter 31 SUB, whose role is to effect the difference between the component Cmax, delivered by way of the connection 32, and the Cs_raw setpoint delivered via the connection 33. The difference, denoted DeltaC, is delivered as output of the subtracter 31 by way of a connection 34.

A mapping 35 (Mapp ActionVeh) is placed parallel to the subtracter 31, and receives as input the speed of the motor vehicle Vveh via a connection 36. The mapping 35 formulates a weighting denoted ActionVeh, taking values between "0" and "1" and delivered via the connection 37. The signal ActionVeh, delivered by the mapping 35, makes it possible to cancel the correction in the cornering phase below an adapted motor vehicle speed threshold, determined by the mapping 35. The signal ActionVeh then ensures progressive disappearance of the filtering as a function of the variation of the speed of the motor vehicle.

A second mapping 38 (Mapp PercDelta) situated in parallel with the block 31 receives as input, via a connection 39, a transverse acceleration value denoted Gammat_fil. This value Gammat_fil originates from a filter 40 (Gammat Filtering) included in the block 17. The block 40 is able to filter, according to a predetermined specific filtering law, the variable Gammat, transmitted to the block 40 via a connection 41. The mapping 38 delivers as output, via the connection 39, a variable denoted PercDeltaraw. This variable is a raw percentage of the deviation between the Cs_raw setpoint and the component C_max. This deviation between the Cs_raw setpoint and the component C_max is the variable DeltaC, which has been calculated by the block 31.

A fourth block 42 (Cornering Signal Construction) is situated in parallel with the block 41. The role of the block 42 is to construct a first cornering recognition setpoint Cor_raw. The block 42 receives as input the transverse acceleration of the motor vehicle Gammat via the connection 43, the engine revs N via the connection 44 and the speed of the motor vehicle Vveh via the connection 45. On the basis of these input parameters the block 42 is able to construct a variable denoted Cor_raw delivered via a connection 46. The formulation of this setpoint will be described in greater detail hereafter.

A block 47 (delayed cornering and filtered cornering construction) is placed at the output of the block 42 for constructing the signal in a cornering situation. The block 47 receives as input the Cor_raw variable, transmitted via the connection 46. In addition to the Cor_raw variable, the speed of the motor vehicle Vveh is also applied to the input of the block 47, via a connection 48. On the basis of the input data, the block 47 constructs two signals Cor_fil transmitted as output via a connection 49 and Cor_del transmitted as output via a connection 50.

Figure 3:
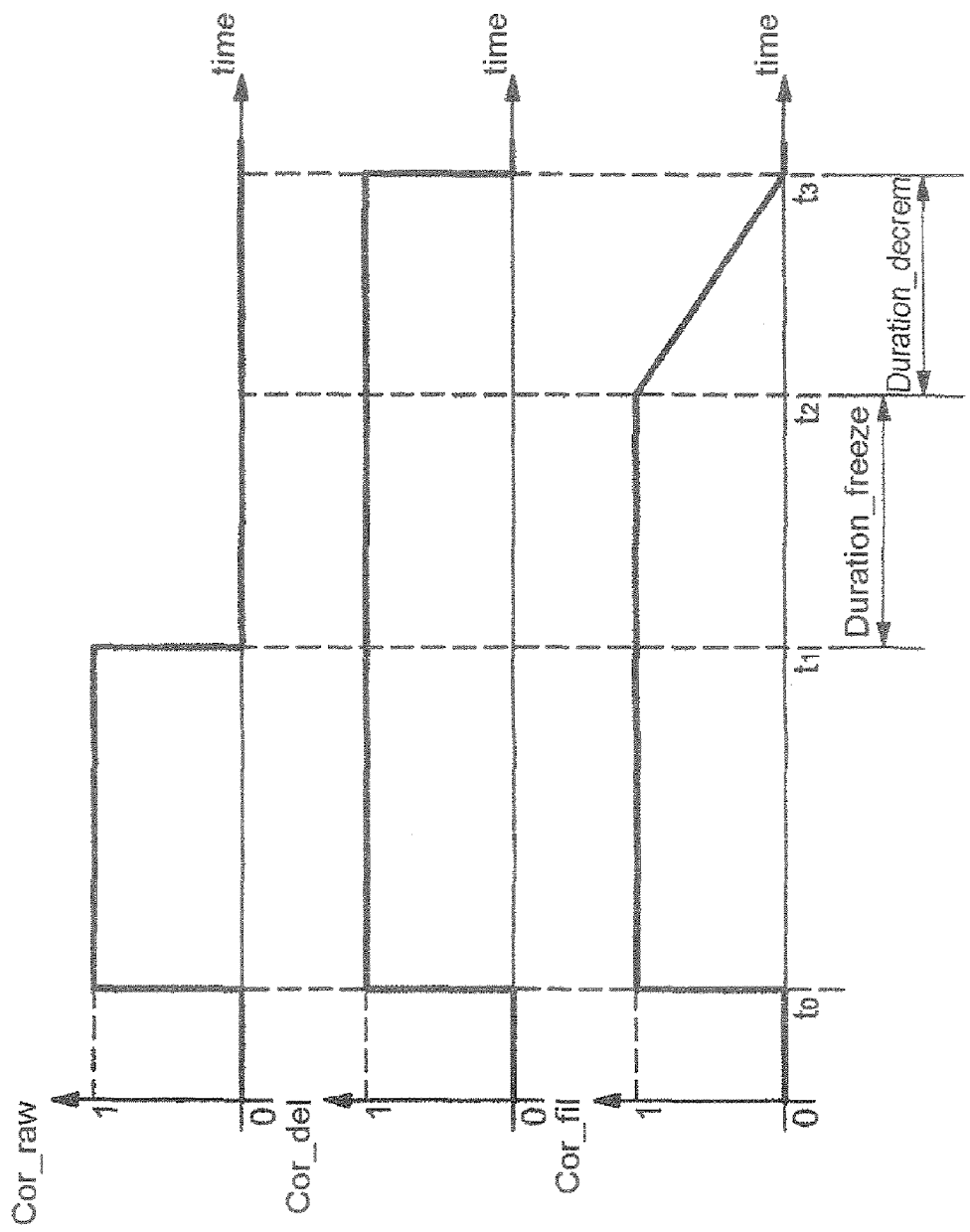
FIG. 3 illustrates an example of the signals delivered by a block of the diagram represented in FIG. 2.

The variation of the two signals Cor_fil and Cor_del is represented in FIG. 3 as a function of time. It is considered that the signal Cor_raw is a step taking the value "1" between t0 and t1 and "0" otherwise. The signal Cor_del makes it possible to keep the correction between t1 and t3, i.e. for a total duration equal to Duration_freeze+Duration_decrem, after the disappearance of the signal Cor_raw at t1. The signal Cor_fil makes it possible for its part, to progressively weaken the effect of the correction. Thus, the signal Cor_fil takes the value "1" at t0 until t2 then decreases progressively, for example in the form of a linear ramp, between t2 and t3, i.e. for a duration Duration_decrem. The two variables Duration_freeze and Duration_decrem are two variables calibratable by the constructor. They can represent a duration, as in the example of FIG. 3, or a distance traversed by the motor vehicle (by integrating the speed of the motor vehicle).

FIG. 2 is referred to again. The signal Cor_fil is transmitted to a first multiplier 51 MUL1 via the connection 49. The multiplier 51 is situated at the output of the blocks 31, 35, 38 and 47 and also receives the signals ActionVeh and PercDeltaraw respectively via the connections 37 and 39. The signal PercDelta resulting from the multiplication of the three input signals, Cor_fil, ActionVeh and PercDeltaraw, represents the percentage of the variation in torque to be applied to the wheels of the motor vehicle that one actually wishes to apply.

A second multiplier 53 MUL2 is placed at the output of the first multiplier 51. The multiplier 53 receives the variable PercDelta calculated previously and transmitted via a connection 52. The multiplier 53 receives, via the connection 34, the variable DeltaC delivered by the subtracter 31. By multiplying the two variables PercDelta and DeltaC, the multiplier 53 delivers as output, via a connection 54, the signal DeltaC_cor which represents the variation of the static torque applicable to the wheels of the motor vehicle, that one wants to apply.

An adder 55 ADD situated at the output of the multiplier 53 receives as input the aforesaid variable DeltaC_cor, via the connection 54, as well as the torque Cs_raw, via a connection 56. The sum of the two signals DeltaC_cor and Cs_raw results in the setpoint Cs_cor_calculated, which is the static torque potentially applicable to the wheels of the motor vehicle in the cornering phase and beyond.

A selector 57 is placed at the output of the adder 55. The selector 57 receives as input the setpoint Cs_cor_calculated, transmitted via a connection 59, and the torque setpoint Cs_raw transmitted via a connection 58. The selector 57 also receives a control signal which is the signal Cor_del formulated by the block 47. As a function of the control signal Cor_del, the selector 57 is able to deliver an output signal corresponding to one or the other of these input signals.

As a function of the value of Cor_del, one of the configurations represented in FIG. 2 holds. If "Cor_del=0", the correction in the cornering phase is not applied. The multiplexer 57 establishes a connection 60 between the input where the Cs_raw signal is transmitted and its output terminal so as to deliver the Cs_raw setpoint as output. If "Cor_del=1", the motor vehicle is in a second configuration where it is considered in a cornering situation or coming out of a corner. The calculated correction is therefore applied. The selector 57 establishes a connection 61 between the input where the signal Cs_cor_calculated is transmitted and its output so as to deliver the setpoint Cs_cor_calculated as output. The latter is applied so long as the control signal Cor_del is equal to "1".

Figure 4:
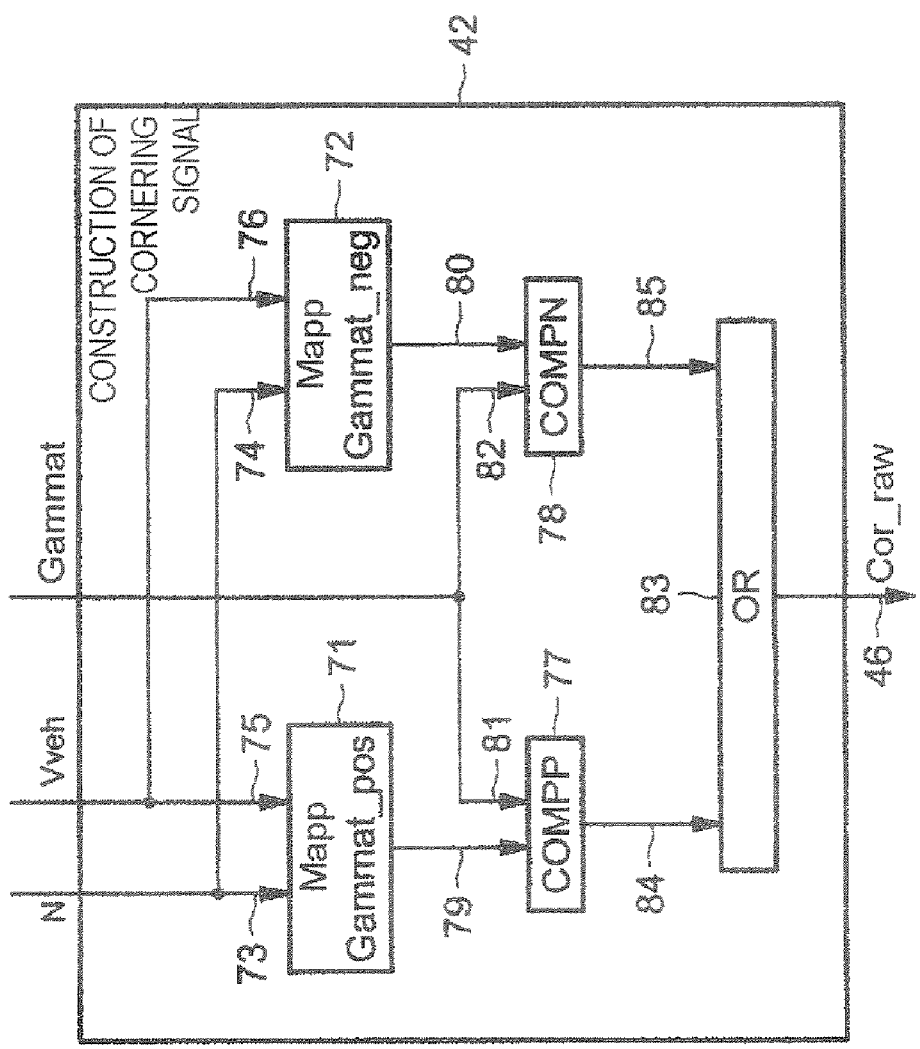
FIG. 4 represents in greater detail an exemplary embodiment of a part of the diagram of FIG. 2.

FIG. 4 is now referred to. This figure details the block 42. The block 42 formulates the signal Cor_raw, which is a binary signal indicating whether or not the motor vehicle is in a cornering situation. The signal Cor_raw thus takes the value "1" if the motor vehicle is in a cornering situation and "0" otherwise.

The block 42 receives various input parameters, delivered to the blocks included in the module 2 by the input block 1, represented in FIG. 1. The block 42 receives in particular signals representative of the engine revs N, of the speed of the motor vehicle Vveh and of the transverse acceleration of the motor vehicle, Gammat.

Inside the block 42 are stored two mappings 71 and 72 denoted respectively Mapp Gammat_pos and Mapp Gammat_neg. These two mappings can formulate positive and negative dynamic threshold values, corresponding respectively to a cornering to the right or to the left. In a variant of the embodiment of the invention, it would be possible to use a single mapping and to formulate a threshold as a function of the absolute value of Gammat.

The thresholds are mapped as a function of the engine revs N transmitted via connections 73 and 74, and of the speed of the motor vehicle Vveh transmitted via connections 75 and 76.

The two mappings 71 and 72 can each deliver a threshold value transmitted respectively to two comparators COMPP 77 and COMPN 78. The two threshold values are transmitted by way of the respective connections 79 and 80.

The function of the two comparators 77 and 78 is to compare the value of the transverse acceleration Gammat with the two threshold values formulated by the mappings 71 and 72. The transverse acceleration Gammat is transmitted via connections 81 and 82. If the motor vehicle approaches a right-hand corner, the comparator 77 delivers a signal having the value "1" via the connection 84, while the other comparator 78 delivers a signal having the value "0". If the motor vehicle approaches a left-hand corner, the comparator 78 delivers a signal having the value "1" via the connection 85, while the other comparator 77 delivers a signal having the value "0". If the motor vehicle is not in a cornering situation the two comparators each deliver a signal having the value "0".

A block 83 OR is placed at the output of the two comparators 77 and 78. The block 83 receives as input the signals transmitted via the connections 84 and 85 by the comparators 77 and 78 and delivers as output, via the connection 46, the signal Cor_raw. If one of the input signals, delivered by the comparators 77 and 78, is set to "1", the signal Cor_raw then takes the value "1"; it takes the value "0" otherwise.

FIG. 2 is referred to again. The static component of torque Cs thus increased, by the component DeltaC_cor, in a cornering situation affords several advantages. It makes it possible to preset the power train on an operating point, thus offering a greater torque reserve applicable to the motor vehicle wheel, thereby allowing the motor vehicle to accelerate more rapidly on coming out of a corner, in response to a request of the driver. Specifically, to obtain the torque reserve applicable to the motor vehicle wheel, the power train is positioned on an engine revs operating point formulated as a function of the torque to be applied to the motor vehicle wheel) that is greater than it would have been without this increased demand. This results in an acoustic effect known to the driver during a downshift at the start of cornering and above all, this prevents the engine revs from descending rapidly to low values in a cornering situation, to which the driver is not accustomed.

The invention claimed is:

1. A method of controlling an automated transmission of a power train for a motor vehicle, comprising:
formulating a torque setpoint to be applied to wheels of the motor vehicle, the torque setpoint including static and dynamic components and formulated as a function of predetermined input parameters including input data representative of characteristics of the motor vehicle, input data interpreted to reflect a desire of the driver, and input data relating to an environment of the motor vehicle, wherein
an adaptation of the torque setpoint in a cornering phase and beyond the cornering phase is based on the static component of torque as a function of the predetermined input parameters, the adaptation in the cornering phase including:
producing a dynamic component of raw torque representative of the desire of the driver as a function of the predetermined input parameters, then correcting the dynamic component of raw torque to obtain a dynamic torque component,
determining a static component of raw torque on the basis of the dynamic torque component, and
calculating a static torque component adapted to a cornering situation, as a function of the static component of raw torque.

2. The method as claimed in claim 1, wherein the static torque component adapted to the cornering situation is integrated with additional corrections, dependent on a driving phase considered, so as to deliver a static component of optimal torque.

3. The method as claimed in claim 1, wherein the torque setpoint in the cornering phase and beyond the cornering phase is adapted as a function of a signal representative of a position of an accelerator pedal of the motor vehicle.

4. The method as claimed in claim 1, wherein the torque setpoint in the cornering phase and beyond the cornering phase is adapted as a function of engine revs of the motor vehicle.

5. The method as claimed in claim 1, wherein the torque setpoint in the cornering phase and beyond the cornering phase is adapted as a function of transverse acceleration of the motor vehicle.

6. The method as claimed in claim 1, wherein the torque setpoint in the cornering phase and beyond the cornering phase is adapted as a function of speed of the motor vehicle.

7. The method as claimed in claim 1, wherein the torque setpoint in the cornering phase and beyond the cornering phase is adapted as a function of instantaneous maximum torque applicable to the wheels of the motor vehicle.

8. The method as claimed in claim 1, wherein the calculating the static torque component adapted to a cornering situation comprises:
calculating a raw cornering setpoint signal as a function of speed of the motor vehicle, of transverse acceleration of the motor vehicle, and of engine revs of the motor vehicle,
constructing a first step signal corresponding to the raw cornering setpoint signal but delayed, and a second signal corresponding to the raw cornering setpoint signal but filtered, and
comparing and integrating the signal corresponding to the raw cornering setpoint signal but filtered, with a list of predetermined input parameters comprising the static component of raw torque, instantaneous maximum torque applicable to the wheels of the motor vehicle, speed of the motor vehicle, and transverse acceleration of the motor vehicle.

9. The method as claimed in claim 8, wherein the raw cornering setpoint signal is constructed by comparing the transverse acceleration of the motor vehicle with dynamic thresholds mapped as a function of the speed of the motor vehicle and of the engine revs of the motor vehicle.

10. A device of an automated transmission of a power train for a motor vehicle configured to deliver a torque setpoint signal to be applied to wheels of the motor vehicle, including static and dynamic components, the torque setpoint formulated as a function of input data delivered by an input block that includes a recorded list of parameters representative of a desire of the driver, of a state of the motor vehicle, and of an environment of the motor vehicle, comprising:
- a first block configured to calculate a dynamic torque component without adaptation to a cornering situation;
- a second block configured to calculate a static component of raw torque, connected to an output of the first block; and
- a block for adaptation to the cornering situation delivering a static torque component adapted to the cornering situation as a function of a list of predetermined input parameters.

11. The device as claimed in claim 10, further comprising means for integrating the static torque component adapted to the cornering situation with additional corrections dependent on a driving phase considered.

12. The device as claimed in claim 10, wherein the list of predetermined parameters of the block for adaptation to the cornering situation comprises the static component of raw torque, instantaneous maximum torque applicable to the wheels of the motor vehicle, speed of the motor vehicle, transverse acceleration of the motor vehicle, and a current setpoint of engine revs.

13. The device as claimed in claim 10, wherein the block for adaptation to the cornering situation of the static component of raw torque comprises:

- a first construction block for constructing a raw cornering setpoint signal,
- a second construction block for constructing a step signal corresponding to the raw cornering setpoint signal but delayed, and a signal corresponding to the raw cornering setpoint signal but filtered,
- a filtering block for filtering transverse acceleration of the motor vehicle,
- means for storing a first mapping delivering a weight setpoint as a function of speed of the motor vehicle,
- means for storing a second mapping so as to determine, as a function of transverse acceleration of the motor vehicle filtered by the filtering block, a percentage of deviation between an instantaneous maximum torque component applicable to the wheels of the motor vehicle and the static component of raw torque, and
- means for comparing and for integrating the raw cornering setpoint signal but filtered, with the raw static torque component, of the instantaneous maximum torque applicable to the wheels of the motor vehicle, the speed of the motor vehicle, engine revs of the motor vehicle, and transverse acceleration of the motor vehicle.

14. The device as claimed in claim 13, wherein the first construction block comprises means for storing two mappings relating respectively to positive and negative thresholds of the transverse acceleration of the motor vehicle and comparison means for generating the raw signal representative of the cornering as a function of a list of predetermined input parameters.

15. The device as claimed in claim 14, wherein the list of predetermined parameters comprises the engine revs of the motor vehicle, the transverse acceleration of the motor vehicle, and the speed of the motor vehicle.

* * * * *